(12) United States Patent
Fukunaga et al.

(10) Patent No.: US 6,840,977 B1
(45) Date of Patent: Jan. 11, 2005

(54) COOLANT FOR AIR-BAG GAS GENERATOR AND PRODUCTION METHOD THEREFOR

(75) Inventors: Katsuaki Fukunaga, Hyogo (JP); Satoshi Yagi, Hyogo (JP); Mitsunori Ota, Aichi (JP); Masahiro Chiba, deceased, late of Osaka (JP); by Emiko Chiba, legal representative, Osaka (JP)

(73) Assignees: Daicel Chemical Industries, Ltd., Osaka (JP); Chuo Hatsujo Kabushiki Kaisha, Aichi (JP); Kansai Wire Netting Co., Ltd., Osaka (JP)

( * ) Notice: Subject to any disclaimer, the term of this patent is extended or adjusted under 35 U.S.C. 154(b) by 343 days.

(21) Appl. No.: 10/018,956

(22) PCT Filed: Jul. 12, 2000

(86) PCT No.: PCT/JP00/04672

§ 371 (c)(1),
(2), (4) Date: Dec. 27, 2001

(87) PCT Pub. No.: WO01/05632

PCT Pub. Date: Jan. 25, 2001

(30) Foreign Application Priority Data

Jul. 14, 1999 (JP) ............................................. 11/200179

(51) Int. Cl.$^7$ ............................ B01D 39/20; B01D 46/24
(52) U.S. Cl. .......................... 55/526; 55/385.3; 55/525; 55/DIG. 5; 96/421; 280/728.1; 280/734; 280/736; 280/740; 29/896.62; 29/902; 442/167
(58) Field of Search ................................. 55/385.3, 525, 55/526, DIG. 5, DIG. 43; 96/421; 95/273; 280/728.1, 734, 736, 737, 738, 740, 742, 741; 29/896.62, 902, DIG. 77; 422/164, 167, 305

(56) References Cited

U.S. PATENT DOCUMENTS

| | | | |
|---|---|---|---|
| 2,334,263 A | * | 11/1943 | Hartwell ...................... 55/525 |
| 5,064,459 A | * | 11/1991 | Unterforsthuber et al. .... 55/526 |
| 5,217,515 A | * | 6/1993 | Guglielmi ..................... 55/526 |
| 5,503,806 A | * | 4/1996 | Fulmer et al. ............... 280/736 |
| 5,660,606 A | * | 8/1997 | Adamini ...................... 55/526 |
| 5,849,054 A | * | 12/1998 | Fujisawa ...................... 55/525 |
| 6,116,643 A | | 9/2000 | Katsuda et al. |
| 6,135,496 A | | 10/2000 | Katsuda et al. |
| 6,183,006 B1 | | 2/2001 | Katsuda et al. |
| 6,277,166 B2 | * | 8/2001 | Zettel et al. ................ 55/385.3 |

FOREIGN PATENT DOCUMENTS

| | | | | |
|---|---|---|---|---|
| EP | 0 623 373 A1 | 11/1994 | | |
| EP | 0 876 943 A2 | 11/1998 | | |
| JP | 1-293112 | * | 11/1989 | ........... B01D/39/12 |
| JP | 4-66348 | * | 3/1992 | ........... B01D/39/12 |
| JP | 6-55991 | * | 3/1994 | ........... B01D/39/12 |
| JP | 10-119705 A | | 5/1998 | |
| JP | 10-119705 | * | 5/1998 | ........... B60R/21/26 |
| JP | 10-315897 | | 12/1998 | |
| JP | 11-020598 | | 1/1999 | |

* cited by examiner

*Primary Examiner*—Duane Smith
*Assistant Examiner*—Jason M. Greene
(74) *Attorney, Agent, or Firm*—Birch, Stewart, Kolasch & Birch, LLP.

(57) ABSTRACT

The present invention provides a coolant for an air bag inflator in which unevenness in density in the axial direction is reduced even though the coolant is compressed in its axial direction.

The coolant is a molded product made of wire rods and compressed in its axial direction. An absolute value of a difference between a radial pressure loss of the axially upper half portion of the coolant and a radial pressure loss of the axially lower half portion of the coolant is 10 mm H$_2$O or less at a flow rate of 250 liters/minute under the atmosphere of 20° C.

13 Claims, 7 Drawing Sheets

33

33

33

COOLANT FOR AIR-BAG GAS GENERATOR AND PRODUCTION METHOD THEREFOR

This application is the national phase under 35 U.S.C. § 371 of PCT International Application No. PCT/JP00/04672 which has an International filing date of Jul. 12, 2000, which designated the United States of America.

TECHNICAL FIELD TO WHICH THE PRESENT INVENTION BELONGS

The present invention relates to a coolant for an air bag inflator and a process for providing the same.

RELATED ART

An air bag apparatus is mounted to a vehicle such as an automobile in order to protect a passenger from the impact of collision. The air bag apparatus actuates an inflator when a sensor detects the impact, and form a cushion (air bag) between the passenger and the vehicle.

The inflator used for the air bag apparatus is activated by an impact sensor detecting an impact, thereby discharging an operating gas (combustion gas) for inflating the air bag (bag body). The operating gas for inflating the air bag (bag body) is usually cooled and/or purified by coolant means accommodated in a housing of the inflator and then, the gas is discharged from a gas discharge port of the housing and introduced into the air bag.

Conventionally, since the coolant means functionally needs to purify and cool the combustion gas generated due to combustion of the gas generating means, a molded product of wire mesh made of various wire meshes is generally used as the coolant means. In particular, when the molded product of wire mesh is formed to have a desired size, strength and pressure loss, preferably, a compress-molded product of wire mesh obtained by compressing the molded product of wire mesh in the axial and/or radial direction is used. Such a compress-molded product of wire mesh is generally formed by putting a molded product of metal wire mesh into a mold and compressing with one-shot presswork. And EP00623373 discloses a method of producing the coolant means including a process of compressing with the presswork. According to this method, a wire rods of a cooling material is deformed into a waveform, then put into a mold, and lightly compressed to roughly determine its shape, thereby forming a semi-molded product. Consequently, the semi-molded product is coiled around with wire rods deformed into a waveform and then again placed into the mold and pressed, thereby forming the coolant means.

In the coolant means, the combustion gas generated due to combustion of the gas generating means should pass uniformly through the coolant means, and further, the need to arrange the axis-disposing direction of the coolants in the housing should be eliminated. In a view of the above, it is preferable that inequable density in the axially upper and lower ends of the coolant (inequable in pressure loss in the radial direction) is made as consistent as possible.

However, conventionally, no improvement concerning the unevenness in a radial pressure loss of the coolant has been found. Especially in the case of the compressed molded product of wire mesh obtained by compressing the molded product of wire mesh, mostly, the coolant means is compressed at a stroke(s) only on one axial side. Because of this compression manner, the compressed side tends to shrunk more, and the density of the coolant means in the axial direction becomes uneven. Therefore, the radial pressure losses in the axially upper and lower portion of the coolant cannot be uniformed.

The coolant means produced by such a conventional method has uneven pressure loss due to a difference in the density generated in the axial direction. As a result, in the inflator using such a coolant means, output is varied due to the direction to which density of the coolant means is uneven (i.e., due to the difference of the pressure loss).

Disclosure of the Present Invention

Therefore, it is an object of the present invention to provide a coolant to solve the problems of the above conventional coolant means, which is made of wire rods, compressed at least in the axial direction to have a desired size, strength and pressure loss and have a small unevenness in density in the axial direction, and also to provide a method of producing the coolant. It is another object of the invention to provide coolant means which needs no disposing direction in a housing of an inflator.

A coolant means for an air bag inflator of the present invention is obtained by compressing a molded product made of wire rods at least in the axial direction. This coolant means is characterized in that a difference between a radial pressure loss of an axially upper half portion of the coolant and a radial pressure loss of the axially lower half portion of the coolant is made as small as possible. As a result, according to the coolant means of the present invention, a combustion gas generated due to combustion of the gas generating means can pass uniformly through the coolant means, and it is unnecessary to arrange the disposing direction of the coolant in a housing.

That is, a coolant for an air bag inflator of the present invention is cylindrical in shape, disposed in a housing of the inflator for the air bag in order to cool and/or purify a gas discharged from the inflator, and obtained by compressing axially a molded product made of wire rods on the axially opposite ends. Further, in the coolant obtained by compressing a molded product made of wire rods in the axial direction, an absolute value of a difference between a radial pressure loss of the axially upper half portion of the coolant and a radial pressure loss of the axially lower half portion of the coolant is preferably 10 mmH$_2$O or less, and more preferably, 6 mmH$_2$O or less at a flow rate of 250 liters/minute under the atmosphere of 20° C.

The radial pressure loss of the axially upper half portion of the coolant is measured in such a manner that an inner surface of the axially lower half of the coolant is covered with a covering member and a gas at a flow rate of 250 liters/minute is introduced into the coolant under the atmosphere of 20° C. And the radial pressure loss of the axially lower half portion of the coolant is measured in such a manner that an inner surface of the axially upper half of the coolant is covered with a covering member and a gas at a flow rate of 250 liters/minute is introduced into the coolant under the atmosphere of 20° C.

In a method of producing a coolant for an air bag inflator including a compressing process of compressing a cylindrical molded product in the axial direction, by this compressing process, a difference in the pressure losses between the axially opposite ends of the coolant can be 10 mmH$_2$O or less when it is measured in accordance with the following method:

<Measuring Method>
1) an inner peripheral surface of a cylindrical coolant is covered from its axial end to its one-half the height with a covering member;
2) one end of the coolant in which the covering member is fitted is closed with a supporting member having a manometer, the other end of the coolant is closed with another supporting member having a gas-inflow pipe and a gas-flow meter, and the coolant is fixed in the axial direction so that air will not leak between the ends of the coolant and the supporting members;

3) the air at 250 liters/minute is introduced from the gas-inflow pipe into an internal space of the covering member under the atmosphere of 20° C. and the pressure loss is measured;

4) next, the coolant is turned upside down in the axial direction, the opposite side of 1) (i.e., the side through which the air passed in 3)) is now covered with the covering member, and the pressure loss of the coolant is measured under the same conditions as 2) and 3); and 5) a difference in the pressure loss values obtained in 3) and 4) is obtained, and its absolute value is determined as a difference in the pressure losses in the radial direction in the axial ends of the coolant.

It is preferable that the coolant for an air bag inflator of the present invention is formed by laminating plain-knitted wire mesh having a diameter of 0.3 to 0.6 mm and then, compressing the laminated wire mesh in the radial and axial directions. And it is also preferable that the coolant has a bulk density of 3.0 to 5.0 g·cm$^{-3}$, and more preferably 3.5 to 4.5 g/cm$^{-3}$. And preferably, the coolant has a pressure loss of 10 mmH$_2$O to 2000 mmH$_2$O with respect to an amount of air of 1000 liters min$^{-1}$ under the atmosphere of 20° C. Desirably, the coolant is obtained by forming plain-knitted wire mesh made of stainless-steel wire rods into an annular laminated body and compressing the laminated body.

An inflator using the coolant having a small density difference in the axial direction exhibits a stable output performance. That is, in the case of a coolant having a difference in density in the axial direction, when a gas generated from the gas generating means passes through a denser portion in density of the coolant, a residence time of the gas in the coolant becomes longer. Consequently, heat exchange is carried out sufficiently, which lowers a temperature of the generated gas and an output of the inflator in result. On the other hand, when a gas passes through a thinner portion in density of the coolant, a ventilation resistance of that portion is lower than that of the denser portion, the heat exchange is not carried out so effectively, which does not lower a temperature of the generated gas. In the coolant having a density-difference in the axial direction, the output performance varies based on the difference in the temperatures of the generated gases. The coolant of the present invention has a small density difference in the axial direction and thus, the inflator using this coolant can exhibits the stable output performance.

When the above-described coolant is produced, a stainless steel is preferably used and especially, SUS304, SUS310S, SUS316 (JIS Standard) can be used. SUS304 (18Cr-8Ni-0.06C) exhibits excellent corrosion resistance as austenitic stainless steel. In addition, an expansion-suppressing means can be formed at the outer peripheral portion of the coolant. The expansion-suppressing means functions as a means to reliably keep a gap between the coolant and the housing (especially at the time of actuation of the inflator) when the coolant is disposed in the inflator. For example, the expansion-suppressing means can be realized by disposing a laminated wire-mesh layer or the like having different wire diameter, pressure loss or the like outside the coolant. In this case, the coolant has a double layer structure, and the outer layer prevents the coolant from expanding, due to a gas pressure at the time of actuation of the inflator, to close the gap between the coolant and the housing.

The present invention also provides a method of producing a coolant for an air bag inflator including a compressing process of compressing a molded product particularly in the axial direction.

That is, the present invention provides the method of producing a coolant for an air bag inflator including a compressing process of compressing a cylindrical molded product at least in the axial direction, wherein, in the compressing process, axially opposite sides of the molded product are compressed in the axial direction. Preferably, the compressing process is carried out such that an absolute value of a difference between a radial pressure loss of the axially upper half portion of the coolant and a radial pressure loss of the axially lower half portion of the coolant is adjusted to be 10 mmH$_2$O or less at a flow rate of 250 liters/minute under the atmosphere of 20° C. The radial pressure loss of the axially upper half portion can be measured in such a manner that an inner surface of the axially lower half of the coolant produced in the above method is covered with a belt-like member and a gas at a flow rate of 250 liters/minute is introduced into the inside of the coolant under the atmosphere of 20° C. And the radial pressure loss of the axially lower half portion of the coolant can be measured in such a manner that an inner surface of the axially upper half of the coolant is covered with a belt-like member and a gas at a flow of 250 liters/minute is introduced into the inside of the coolant under the atmosphere of 20° C. It is preferable that the compressing process is carried out such that a difference in pressure losses between the axially opposite ends of the coolant is adjusted to be 10 mmH$_2$O or less when it is measured in accordance with the above-described measuring method.

Such a compressing process can be carried out, for example, as follows. After the molded product is compressed in the axial direction as the first compression step, the molded product is turned upside down in the axial direction and then, compressed in the axial direction as the second compression step, or alternatively, the molded product is compressed on the axial opposite sides without being turned upside down. In particular, in the case of compressing the molded product in two steps, it is preferable that compressing distances of the first and second compression steps are substantially equal to each other. In the compressing process, the molded product can be compressed in the radial direction simultaneously or at different timing in addition to being compressed in the axial direction. In this case, a volume of a coolant can be reduced.

The molded product used in the above producing method may be an annular laminated body obtained by forming a plain-knitted wire mesh made of stainless steel wire rods into a cylindrical body, and folding one end of the cylindrical body outwardly and repeatedly. Or the molded product may be an annular laminated body obtained by forming a plain-knitted wire mesh made of stainless steel wire rods into a cylindrical body, pressing the cylindrical body in the radial direction to form a plate body, and rolling the plate body many times cylindrically. In the molded product obtained in this manner, a surface of the cylindrical body comes on the end surface of the coolant, and therefore, the cut portion of the wire mesh is not outcropped on the end face of the material. Therefore, the cut portion does not hurt a hand of a user.

The above coolant or the coolant produced by the above method is used as a coolant means for an air bag inflator comprising, in a housing thereof with a gas discharge port, an ignition means to be activated upon an impact, gas generating means which is to be ignited and burnt by the ignition means for generating a combustion gas, and a coolant means for purifying and/or cooling the combustion gas, thereby realizing an air bag inflator of the present invention. When the inflator uses the coolant of the present invention, a stable actuating performance can be obtained irrespective of a direction of the coolant. As the members other than the coolant means, such as known gas generating means, ignition means and the like can be used in the inflator.

The air bag inflator is accommodated in a module case together with an air bag (bag body) which introduces therein a gas generated by the inflator to inflate, thereby making an air bag apparatus. In this air bag apparatus, the inflator is actuated on an impact sensor detecting the impact, and a combustion gas is discharged from a gas discharging port of the housing. The combustion gas flows into the air bag to rupture the module cover and expands, thereby forming cushion absorbing the impact between a passenger and a hard structural component in the vehicle.

The coolant of the present invention is made using wire rods and compressed at least in the axial direction to obtain a desired size, strength and pressure loss, and thereby realizing a coolant in which unevenness in the density in the axial direction is reduced and the need of arranging a disposing direction when disposing in the housing is eliminated. And by adopting the above coolant, an air bag inflator with a stable operating output can be realized.

Figure 1:
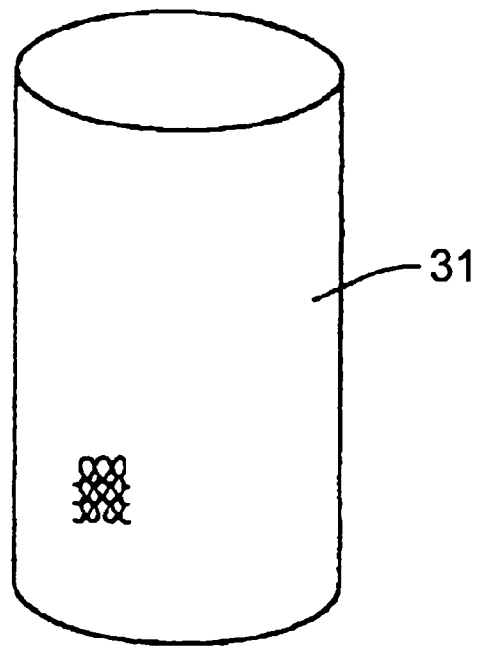
FIG. 1 is a perspective view of a cylindrical wire mesh in processing to a coolant of the present invention.

DESCRIPTION OF REFERENCE NUMERALS 3 housing
4 ignition means
5 transfer charge
6 gas generating agent
7 coolant
14 initiator collar
22 combustion chamber
23 ignition means accommodating chamber
31 cylindrical body
33, 35 molded product
34 plate body
40 covering member
42, 45 supporting member
43 gas-inflow pipe

EMBODIMENTS OF THE PRESENT INVENTION

Hereinafter, embodiments of the present invention will be explained based on the drawings.

"Embodiment of Coolant"

Figure 2:
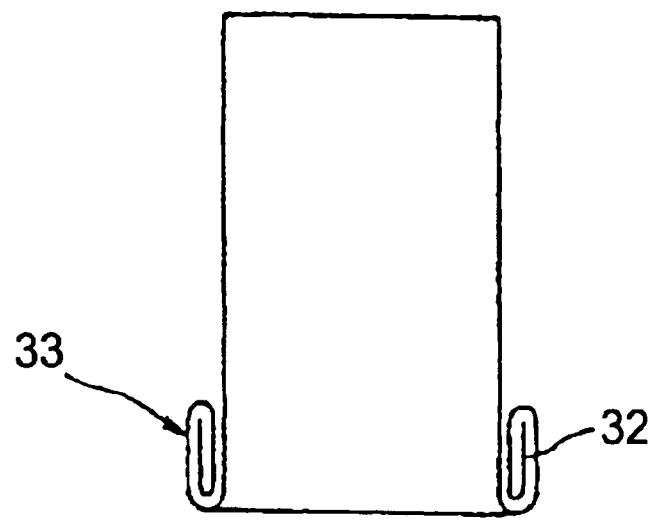
FIG. 2 is a schematic view of an annular molded product formed by folding one end of the cylindrical body outwardly and repeatedly.
Figure 3A:
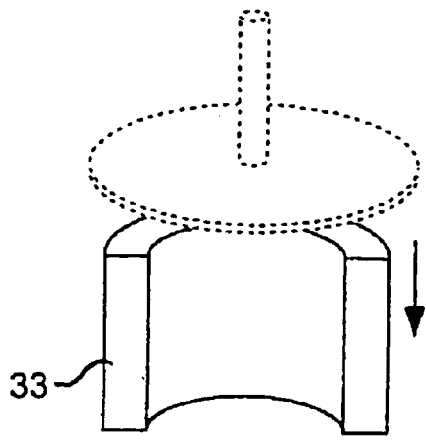
FIG. 3 are schematic views showing compressing process of the coolant of the invention.
Figure 3B:
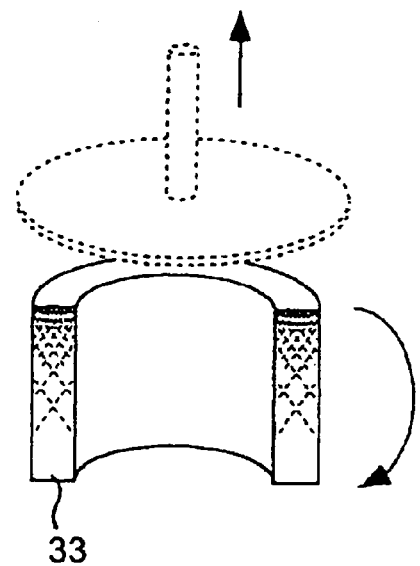
Figure 3C:
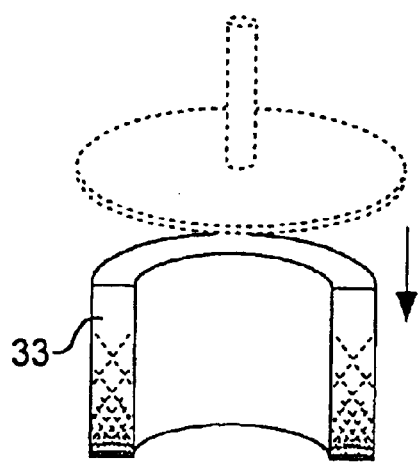
Figure 4:
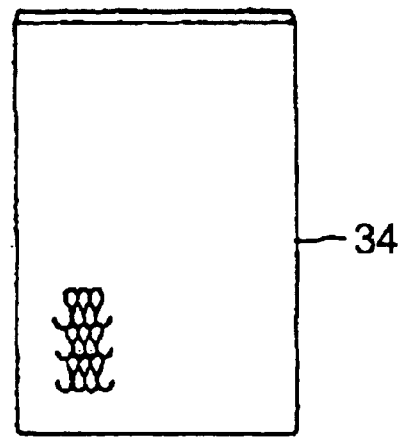
FIG. 4 is a schematic view of a plate body formed by pressing the cylindrical body shown in FIG. 1 in the radial direction.
Figure 5:
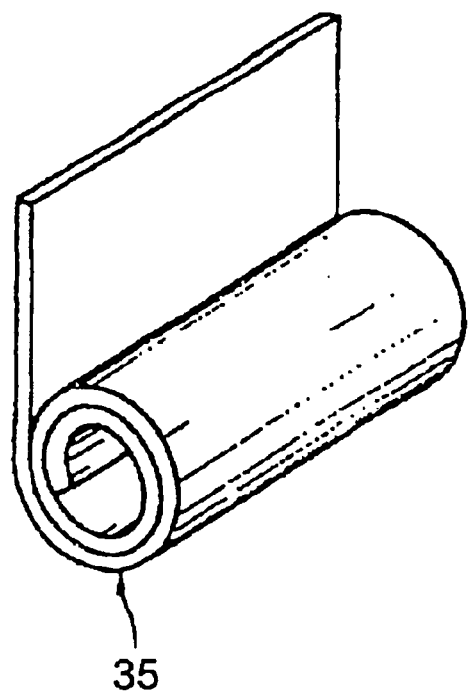
FIG. 5 is a schematic view of the molded product formed by rolling the plate body into a cylindrical shape many times.

A coolant for an air bag of the present invention can be produced in the following manner. First, stainless steel wires having a wire diameter of 0.3 to 0.6 mm are plain-knitted to form a cylindrical body 31 as shown in FIG. 1. Then, as shown in FIG. 2, one end 32 of this cylindrical body 31 is folded outwardly and repeatedly to form an annular laminated body as a molded product 33. The number of folding operations is appropriately determined in view of a diameter of the wire, a thickness of the coolant and the like. Next, a following compressing process is performed. As shown in FIG. 3, the molded product 33 is put into a mold (not shown), and is compressed on one side in the axial direction as the first compression step (FIG. 3a). Then, the molded product 33 is turned upside down in the axial direction (FIG. 3b) and is again compressed in the axial direction as the second compression step (FIG. 3c). In the first and second compression steps, the compression distances is adjusted to be substantially equal to each other. Further, such a compressing process is performed so that an absolute value of a difference between the respective radial pressure losses of the axially upper half and the axially lower half of the molded product 33 is adjusted to be 10 mmH$_2$O or less, more preferably 6 mmH$_2$O or less at a flow rate of 250 liters/minute under the atmosphere of 20° C. The molded product 33 explained based on FIG. 2 can also be formed by other method shown in FIGS. 4 and 5. In this method, after forming the cylindrical body 31 shown in FIG. 1, the cylindrical body 31 is pressed in the radial direction to form a plate body 34 as shown in FIG. 4. Then, as shown in FIG. 5, the plate body 34 is cylindrically rolled over and over to be an annular laminated body as a molded product 35. This molded product 35 can be compressed in the same manner as that shown in FIG. 3 to form a coolant 7. A compressing process of the molded product 35 can be performed in the same manner as shown in FIG. 3 such that, after the first compression step, the molded product 35 is turned upside down and then the second compression step is performed. Alternatively, the molded product 35 can be put in the mold and compressed on the axially opposite sides without turning the product upside down.

With the above-described manufacturing method, a coolant made of compressed wire rods with a uniform pressure loss can be obtained. Concretely, by controlling the compressing process in the above manner, can be obtained the coolant for an air bag inflator, which is made of wire rods, formed by being compressed in the axial direction, and in which an absolute value of the difference between the respective radial pressure losses of the axially upper half and the axially lower half is 10 mmH$_2$O or less at a flow rate of 250 liters/minute under the atmosphere of 20° C.

The coolant 7 formed in the above-described manner has such a shape 36 that loop-like meshes in each layer are crushed, and the crushed meshes are laminated in the radial direction. Therefore, a gap structure of the coolant becomes complicated, and the coolant exhibits an excellent scavenging function. From this point of view, it is preferable that the coolant is adjusted so that a bulk density of the coolant becomes 3.0 to 5.0 g·cm$^{-3}$ in the above compressing process, and that the pressure loss in general becomes 10 mmH$_2$O to 2000 mmH$_2$O with respect to an amount of air of 1000 liters/minute under the atmosphere of 20° C.

It is possible to form a coolant having a double layer structure by inserting another laminated body into the inside of the molded product 33 or 35 and compressing these. The other laminated body can be formed, for example, by winding about twice the plate body 34 shown in FIG. 4 made of wire mesh having a diameter of 0.5 mm as shown in FIG. 5.

EXAMPLE

Figure 6:
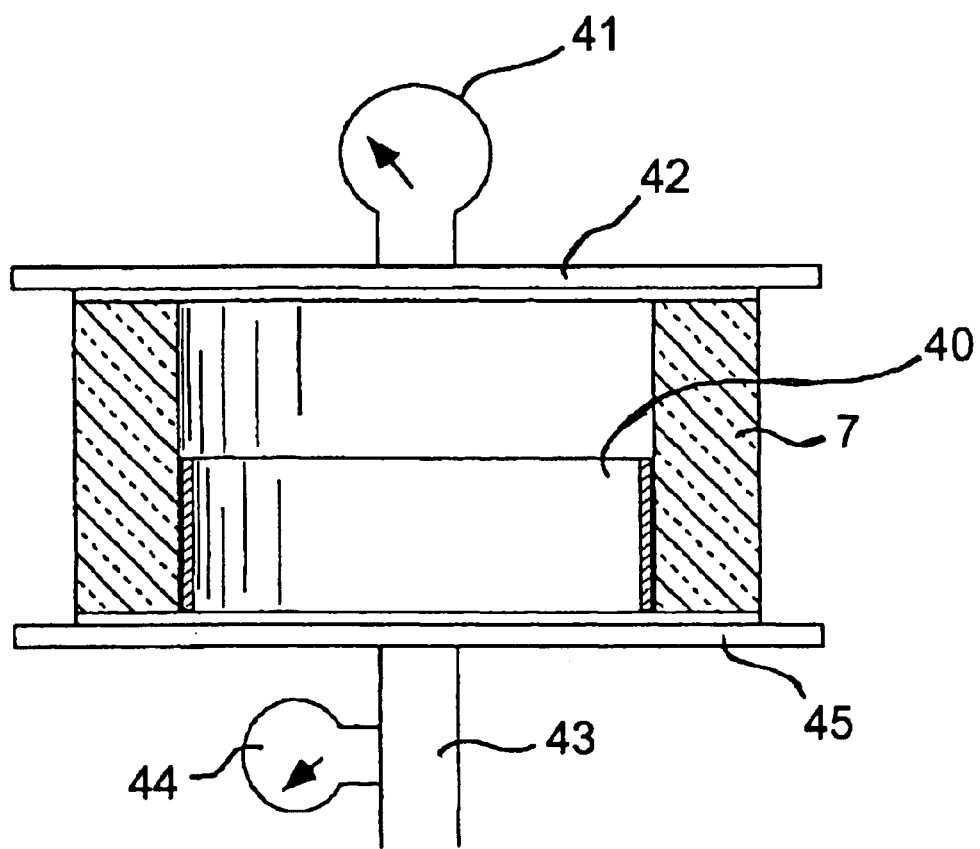
FIG. 6 is a sectional view of an essential portion showing a measuring method of the coolant.

Table 1 shows a result of a test of measuring a pressure loss carried out with the above-described coolant at the flow rate of 250 liters/minute. In this test, the apparatus shown in FIG. 6 is used and the following method is adopted.

TABLE 1

Data of Pressure Loss of Coolant (mmaq)

| No. | All | Upper portion | Lower portion | Difference between upper and lower portions |
|---|---|---|---|---|
| 1 φ60 × φ47 × h29.5 (250 L/min) ||||
| Product manufactured under the current mass-production ||||
| 1 | 7 | 46 | 23 | 23 |
| 2 | 13 | 38 | 27 | 11 |
| 3 | 16 | 41 | 31 | 10 |
| 4 | 11 | 38 | 26 | 12 |
| 5 | 13 | 40 | 27 | 13 |
| 6 | 13 | 46 | 24 | 22 |
| Ave. | 12.2 | 41.5 | 26.3 | |
| Product manufactured by the new production (two times compressing processes) ||||
| 1 | 12 | 40 | 31 | 9 |
| 2 | 16 | 42 | 32 | 10 |
| 3 | 17 | 45 | 35 | 10 |
| 4 | 19 | 39 | 38 | 1 |
| 5 | 17 | 38 | 40 | 2 |
| 6 | 14 | 42 | 32 | 10 |
| Ave. | 15.8 | 41.0 | 34.7 | |
| 2 φ58 × φ47 × h26 (250 L/min) ||||
| Product manufactured under the current mass-production ||||
| 1 | 8 | 28 | 18 | 10 |
| 2 | 10 | 31 | 17 | 14 |
| 3 | 8 | 33 | 21 | 12 |
| 4 | 8 | 35 | 23 | 12 |
| 5 | 9 | 28 | 23 | 6 |
| 6 | 9 | 35 | 24 | 11 |
| Ave. | 8.7 | 31.7 | 21.0 | |
| Product manufactured by the new production (two times compressing processes) ||||
| 1 | 10 | 28 | 28 | 0 |
| 2 | 6 | 28 | 27 | 1 |
| 3 | 10 | 32 | 28 | 4 |
| 4 | 9 | 29 | 29 | 0 |
| 5 | 10 | 27 | 23 | 4 |
| 6 | 11 | 28 | 30 | 2 |
| Ave. | 9.3 | 28.7 | 27.5 | | the Upper portion: the upper side is pressed in the second compression step
the Lower portion: the lower side is pressed in the second compression step <Method of the Test>

1) An inner peripheral surface of the cylindrically formed coolant 7 is covered from its axial end to one half of the height with an annular covering member 40.

2) With the covering member 40 inserted inside, one end of the coolant 7 is closed with a supporting member 42 having a manometer 41 and the other end of the coolant 7 is closed with a supporting member 45 having a gas-inflow pipe 43 and a gas-flow meter 44. The coolant 7 is fixed in the axial direction so that air will not leak between the ends of the coolant 7 and the supporting members 42 and 45.

3) The air at 250 liters/minute is introduced from the gas-inflow pipe 43 into the internal space of the covering member 40, and the pressure loss is measured.

4) Next, the coolant 7 is turned upside down in the axial direction, the remained portion of the coolant which has not been covered in 1) (i.e., the portion through which the air passed in 3)) is now covered with the covering member 40, and the pressure loss of the coolant 7 is measured under the same conditions as 2) and 3).

5) A difference in the pressure loss values obtained in 3) and 4) is obtained, and its absolute value is determined as a difference in pressure losses in the radial direction of the axial ends of the coolant 7.

"Embodiment of Inflator"

Figure 7:
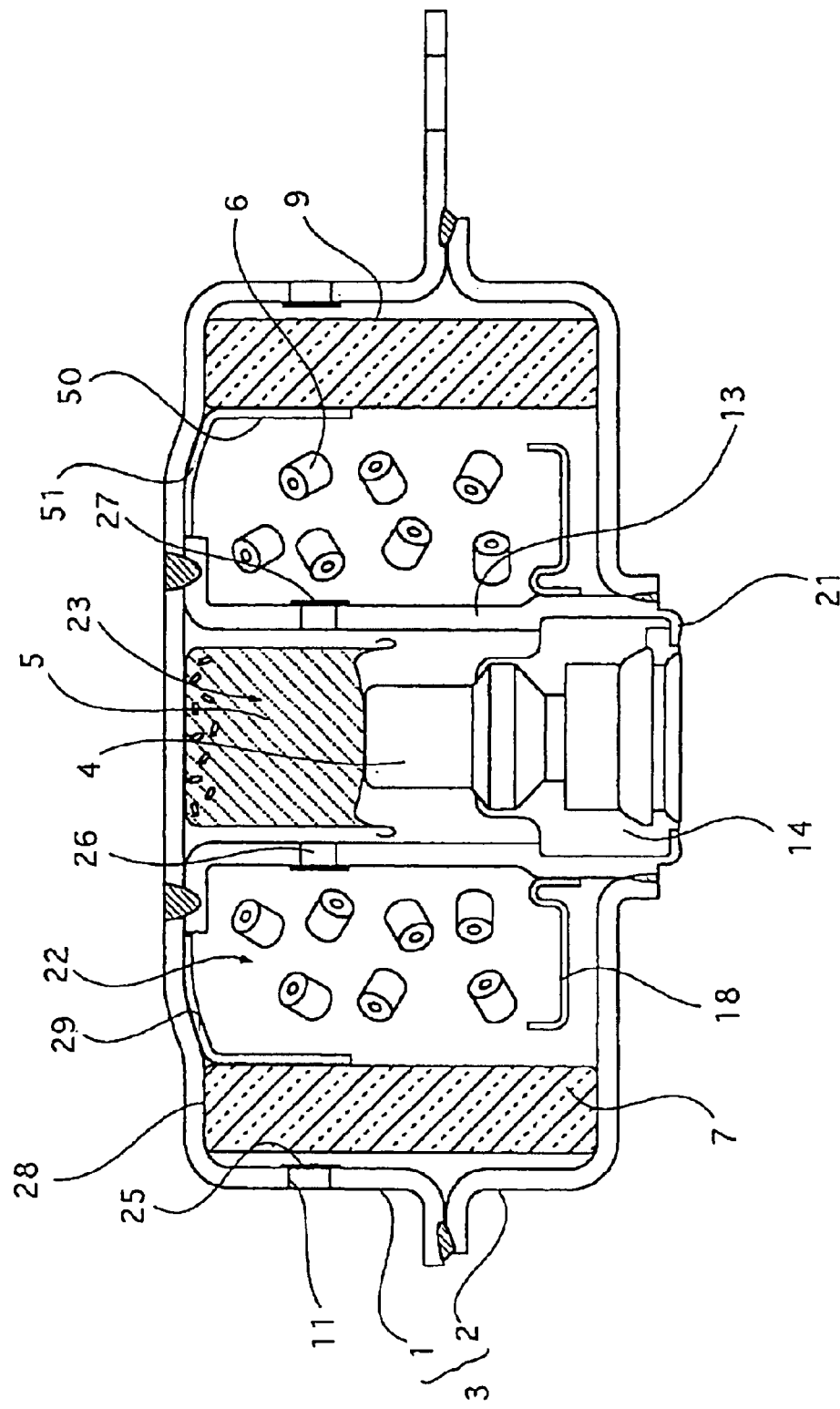
FIG. 7 is a sectional view showing one embodiment of an inflator of the present invention.

FIG. 7 is a longitudinal sectional view of one embodiment of an inflator for an air bag of the present invention.

This inflator comprises a housing 3 formed by joining a diffuser shell 1 having a gas discharge port and a closure shell 2 forming an inner accommodating space together with the diffuser, and a inner cylindrical member 13 in a substantially cylindrical shape disposed in the housing concentrically, an ignition means accommodating chamber 23 defined inside the inner cylinder member 13, and a combustion camber 22 defined outside the inner cylinder member 13. In the ignition means accommodating chamber 23, a ignition means comprising an electric ignition type ignition means 4 to be activated upon the impact and an transfer charge 5 to be ignited upon the activation of the ignition means for generating a flame is accommodated. And in the combustion chamber 22, a gas generating agent 6 to be ignited and burnt by the flame of the transfer charge 5 for generating a combustion gas is accommodated, being supported by an under plate 18. The ignition means 4 is fixed in an initiator collar 14 made of iron, and a skirt of the initiator collar 14 is fixed by crimping a lower end 21 of the inner cylindrical member 13. By making the initiator collar 14 of iron, the ignition means can be reliably fixed in the inflator even due to a high temperature. With this feature, even when the inflator is ignited under a high temperature, the initiator collar can sufficiently resist a combustion internal pressure without lowering its strength and can maintain its ability and function.

The inner cylinder member 13 defining the combustion chamber 22 and the ignition means accommodating chamber 23 is provided with a flame-transferring hole 26 closed by a seal tape 27. Since the seal tape 27 is ruptured by a flame of the transfer charge 5, the ignition means accommodating chamber 23 and the combustion chamber 22 can be in communication with each other through the flame-transferring hole 26.

A substantially cylindrical coolant 7 having a small difference of density in the axial direction is disposed so as to surround the outer periphery of the combustion chamber 22 storing the gas generating agent 6. The coolant 7 is for purifying and/or cooling a combustion gas generated due to combustion of the gas generating agent 6. The coolant 7 is formed by compressing, at least in the axial direction, the upper and lower opposite ends of the molded product made of wire rods.

Particularly, in the inflator shown in the present embodiment, the internal pressure at the time of combustion of the gas generating agent 6 in the housing 3 is adjusted by the total sum of the opening areas ("the total opening area" hereinafter) of all the gas discharge ports 11 formed in the diffuser shell 1. Accordingly, a pressure loss of the coolant 7 in the radial direction is set smaller than a pressure loss of all gas discharge ports 11.

The coolant 7 is held between the diffuser shell 1 and the closure shell 2 by welding the both shells with each other. In the present embodiment, a short pass preventing means 51 which covers the inner peripheral surface of the coolant 7 on the diffuser shell 1 side is interposed between a coolant 7 end surface and a ceiling inner surface 29 of the diffuser shell 1 so as to prevent the combustion gas from passing between the coolant 7 end surface and the ceiling inner surface 29 of the diffuser shell 1. The short pass preventing means 51 is integrally formed with a flame-repellent plate 50 for protecting the coolant from a flame of the transfer charge discharged from the flame-transferring hole. This flame-repellent plate 50 may be formed as a separate member from the short pass preventing means 51, or a perforated basket formed at the specified area with a plurality of through holes may be used instead of the flame-repellent plate 50. A gap 9 is secured outside the coolant 7 so that the combustion gas can pass through the entire surface of the coolant 7.

The gas discharge ports 11 formed in the diffuser shell 1 are closed by a seal tape 25 to block entering of the air. The seal tape 25 is ruptured when the gas is discharged. This seal tape 25 is for protecting the gas generating agent from the outside moisture, and has no effect on adjusting of performance such as combustion internal pressure.

In the inflator constructed in the above-described manner, the electric ignition type ignition means 4 is activated by an activation signal outputted from the sensor detecting an impact to ignite and burn the transfer charge 5. A flame of the burnt transfer charge 5 is discharged from the flame-transferring hole 26 of the inner cylinder member 13 into the combustion chamber 22, and then ignites and burns the gas generating agent 6 in the combustion chamber 22. By the combustion of the gas generating agent 6, a large amount of combustion gas is generated. The combustion gas is cooled while the gas passes through the coolant 7, the combustion residues in the gas are collected, and then, the gas ruptures the seal tape 25 and is discharged from the gas discharge ports 11. When the combustion gas passes through the coolant 7, the combustion gas can be purified and cooled, using the entire surface of the coolant 7 because of the gap 9 secured on the outer periphery of the coolant 7. However, if a portion (the upper portion) of the inner peripheral surface of the coolant 7 is covered with the flame-repellent plate as shown in this embodiment, or is covered with the upper portion of the perforated basket, the combustion gas generated due to combustion of the gas generating agent 6 cannot pass through the covered portion, nor the gas cannot be cooled or purified properly. Therefore, if a coolant, which has an uneven density with a higher density portion and a lower density portion in the axial direction because of the compression manner such as the conventional coolant, is used, the output performance of the inflator is varied depending upon which portion between a higher density portion and a lower density portion is covered. However, if the uneven density in the axial direction is small such as the coolant 7 of the present invention, a stable operational output can be obtained even if which one of the ends comes closer to the housing. Further, the coolant does not need a disposing direction, and there is no effect on the operational performance even if which one of the ends comes closer to the housing. Thus, it is unnecessary to arrange the disposing direction when the coolant is assembled into the inflator, and productivity can be improved.

Figure 8:
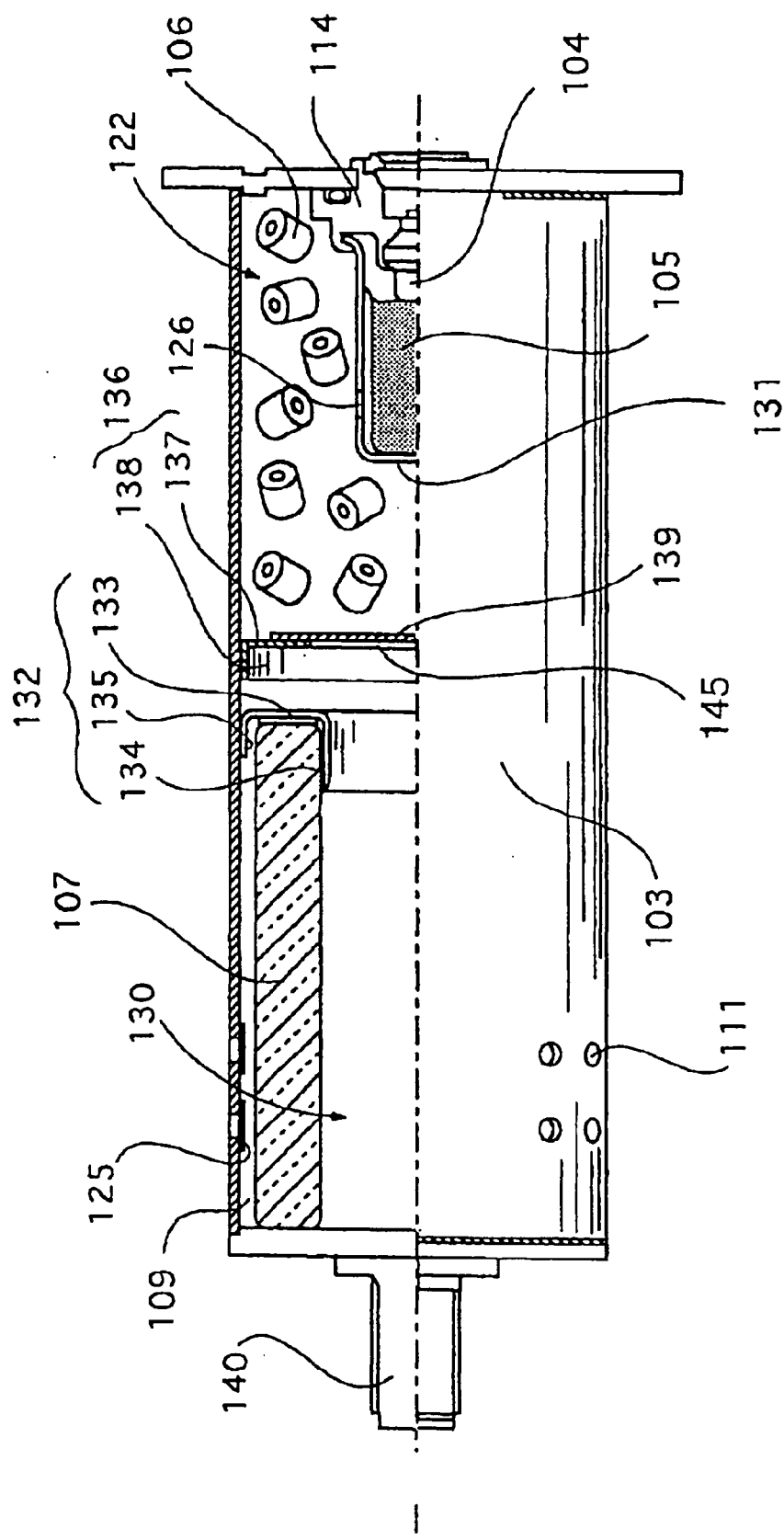
FIG. 8 is a sectional view showing another embodiment of the inflator of the invention.

FIG. 8 is a longitudinal sectional view showing another embodiment of the inflator for air bag according to the present invention. This inflator has a structure particularly suitable for disposing on an passenger side.

The inflator shown in this drawing uses a cylindrical housing 103 having an axial length longer than outer most diameter. An inner space of the housing 103 is divided into a combustion chamber 122 storing a gas generating agent 106 and a coolant accommodating chamber 130 accommodating a coolant 107. Both the chambers are conjoined with each other in the axial direction. In the portion of a peripheral wall of the housing 103 where the coolant accommodating chamber 130 is provided, a plurality of gas discharge ports 111 are formed. The gas discharge ports 111 are closed by seal tapes 125 for moisture-proof inside the housing 103.

In addition to the gas generating agent 106, ignition means, which includes an electric ignition type ignition means 104 to be activated upon an impact and an transfer charge 105 which is to be ignited and burnt upon activation of the ignition means 104 for generating a flame, is disposed in the combustion chamber 122. In FIG. 4, the ignition means is formed as a structure comprising an initiator collar 114 fixed on the end surface of the housing, an ignition means 104 secured to the initiator collar 114, an transfer charge 105 disposed adjacent to the ignition means 104, and a cylindrical container 131 surrounding the transfer charge 105 and being fixed to the initiator collar 114.

The coolant 107 disposed in the coolant accommodating chamber 130 is for purifying and/or cooling a combustion gas generated in the combustion chamber 122, and a coolant which is formed in the same manner as that of the Embodiment 1, with a small density-difference in the axial direction is used. The coolant 107 is cylindrical in shape, and an end thereof on the combustion chamber 122 side is supported by a coolant supporting member 132, and the coolant 107 is disposed coaxially with the housing 103 and facing the inner peripheral surface of the housing 103. A gap 109 having a predetermined width and functioning as a gas passage is provided between the outer peripheral surface of the coolant 107 and an inner peripheral surface of the housing 103. In the present embodiment, the coolant supporting member 132 is formed by providing peripheral walls on the inner periphery and the outer periphery of an annular portion 133 having substantially the same shape as an end of the coolant 107. The inner periphery of the coolant 107 is supported by a peripheral wall 134 of the inner peripheral side, and a peripheral wall 135 of the outer peripheral side is held by the inner peripheral surface of the housing 103.

A sectioning member 136, which divides the combustion chamber 122 and the coolant accommodating chamber 130, comprises a circular portion 137 closing the housing in the radial direction, and a peripheral wall 138 integrally formed with a peripheral edge of the circular portion 137. The circular portion 137 is provided with a communication hole 145 for communicating both chambers. A combustion gas generated in the combustion chamber 122 reaches the coolant accommodating chamber 130 through the communication hole 145. In the present embodiment, the sectioning member 136 is provided with a communication hole 145 having substantially the same size as an inner diameter of the coolant 107. A wire mesh 139 is disposed on the communication hole 145 so that the gas generating agent 106 in the combustion chamber 122 should not move into the coolant accommodating chamber 130 at the time of combustion. Any kind of wire mesh may be used as the wire mesh 139 as long as a size of mesh is good enough to block movement of the gas generating agent 106 during combustion, not having a ventilation resistance such as to control the combustion performance. Of course, an expanded metal can be used instead of the wire mesh.

In the inflator in the present embodiment, the transfer charge 105 is burnt by activation of the ignitor 104 due to an activation signal transmitted from an impact sensor or the like which detects an impact, and the flame thereof ejects from the flame-transferring hole 126 formed in the cylindrical container 131 to ignite and burn the gas generating agent 106. A combustion gas generated by the combustion of the gas generating agent 106 flows into the coolant accommodating chamber 130 through the communication hole 145 of a partition wall 136. The combustion gas passes through the entire surface of the coolant 107 and is purified and cooled, and then ruptures the seal tapes 125 and is discharged from the gas discharge ports 111.

In FIG. 8, the numeral 140 designates a stud bolt for mounting the inflator to a module case.

"Embodiment of Air Bag Apparatus"

Figure 9:
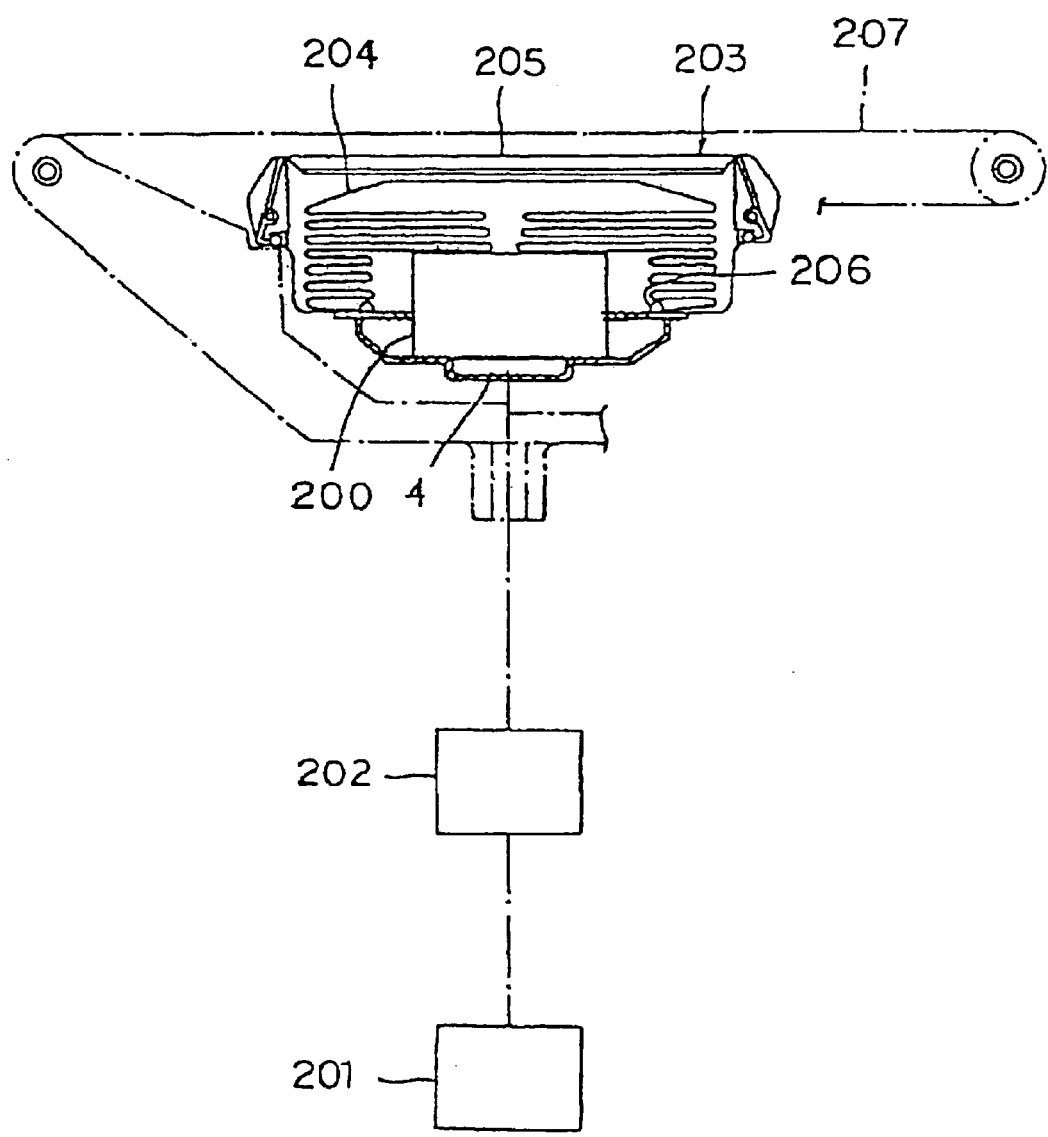
FIG. 9 is a view showing a structure of an air bag apparatus of the present invention.

FIG. 9 shows an embodiment of an air bag apparatus of the present invention provided with an inflator using an electric ignition type ignition means.

This air bag apparatus comprises an inflator 200, an impact sensor 201, a control unit 202, a module case 203 and an air bag 204.

As the inflator 200, the inflator explained based on FIG. 1 is used, and its activation performance is adjusted to give an occupant as a small impact as possible at the initial activation process of the inflator.

The impact sensor 201 can comprise a semiconductor type acceleration sensor for example. In the semiconductor type acceleration sensor, four semiconductor strain gauges are formed on a beam of a silicon substrate designed to bend when acceleration is applied, and these semiconductor strain gauges are bridge-connected. When the acceleration is applied, the beam is bent, and strain is generated on its surface. The resistance of the semiconductor strain gauge is changed due to this strain, and the change in resistance is detected as a voltage signal in proportion to the acceleration.

The control unit 202 includes an ignition judging circuit to which a signal from the semiconductor type acceleration sensor is inputted. The control unit 202 starts calculation when the impact signal from the sensor 201 exceeds a certain value, and when the calculated result exceeds a certain value, the control unit outputs an activation signal to the ignition means 4 of the inflator 200.

The module case 203 is formed of polyurethane for example, and includes a module cover 205. The air bag 204 and the inflator 200 are accommodated in the module case 203, thereby forming a pad module. When the pad module is mounted on the driver side of an automobile, the pad module is usually mounted to a steering wheel 207.

The air bag 204 is formed of nylon (e.g., nylon 66) or polyester, its bag opening 206 surrounds the gas discharge port of the inflator, and the air bag 204 is fixed to a flange of the inflator in a folded state.

When the semiconductor type acceleration sensor 201 senses an impact at the time of collision of an automobile, its signal is sent to the control unit 202, and when the impact signal from the sensor exceeds the certain value, the control unit 202 starts calculation. When the calculated result exceeds the certain value, the control unit outputs an activation signal to the ignition means 4 of the inflator 200. With this activation, ignition means (12*a*, 12*b*) are activated to ignite the gas generating agent, and the gas generated agent is burnt to generate a gas. This gas is ejected into the air bag 204, thereby allowing the air bag to break the module cover 205 and inflating to form a cushion for absorbing an impact between the steering wheel 207 and the occupant.

What is claimed is:

1. A coolant for an air bag inflator, comprising:

a cylindrical coolant body having a uniform thickness defined by an outer diameter and an inner diameter thereof and adapted to be disposed in a housing of the inflator for at least one of cooling and purifying gas discharged from the inflator, said coolant being formed by compressing a first end of a molded product made of wire rods in an axial direction thereof, and compressing a second end, opposing the first end, of the molded product along the axial direction, such that an absolute value of a difference between a radial pressure loss of the axially upper half portion of said coolant closer to the first end and a radial pressure loss of the axially lower half portion of said coolant closer to the second end is adjusted to be 10 mmH$_2$O or less at a flow rate of 250 liters/minute under the atmosphere of 20° C.

2. A coolant for an air bag inflator according to claim 1, wherein the absolute value is 6 mmH$_2$O or less at a flow rate of 250 liters/minute under the atmosphere of 20° C.

3. A coolant for an air bag inflator according to claim 1, a difference in pressure losses between a vicinity of the first end and a vicinity of the second end of said coolant is 10 mmH$_2$O or less, when it is measured in accordance with the following method:

1) covering an inner peripheral surface of a cylindrically formed coolant from one of its axial end to its one-half the height with an annular covering member;

2) closing one of the first end and the second end of said coolant, in which the covering member is fitted, with a first supporting member having a manometer, closing the other of the first end and the second end of said coolant with a second supporting member having a gas-inflow pipe and a gas-flow meter, and fixing said coolant axially to prevent air from leaking between ends of said coolant and the supporting members;

3) introducing the air at a flow rate of 250 liters/minute from the gas-inflow pipe into an inner space of the covering member under the atmosphere of 20° C., and the pressure loss is measured;

4) turning said coolant the other way round with respect to the axial direction and covering the inner peripheral surface of a cylindrically formed coolant from the other one of its axial end to its one-half the height with the annular covering member;

5) closing the other of the first end and the second end of said coolant, in which the covering member is fitted, with the first supporting member, closing the one of the first end and the second end of said coolant with the second supporting member, and fixing said coolant axially to prevent air from leaking between ends of said coolant and the supporting members;

6) introducing the air at a flow rate of 250 liters/minute from the gas-inflow pipe into an inner space of the covering member under the atmosphere of 20° C., and measuring the pressure loss and 7) obtaining a difference in the pressure loss values obtained in 3) and 6), and determining its absolute value as a difference in radial pressure losses in the axial ends of said coolant.

4. A coolant for an air bag inflator according to claim 1, wherein a bulk density of said coolant is 3.0 to 5.0 g/cm$^3$, and said coolant has a pressure loss of 10 mmH$_2$O to 2000 mmH$_2$O with respect to an amount of air of 1000 liters minute$^{-1}$ under the atmosphere of 20° C.

5. A coolant for an air bag inflator according to claim 1, wherein said coolant is an annular laminated body made of wire mesh formed by knitting stainless-steel wire rods.

6. A method of producing a coolant for an air bag inflator, comprising:

compressing a first end of a cylindrical molded product having a uniform thickness defined by an outer diameter and an inner diameter thereof in an axial direction thereof; and compressing a second end of the cylindrical molded product in the axial direction, such that an absolute value of a difference between a radial pressure loss of the axially upper half portion of the molded product closer to the first end and a radial pressure loss of the axially lower half portion of the molded product closer to the second end is adjusted to be 10 mmH$_2$O or less at a flow rate of 250 liters/minute under the atmosphere of 20° C.

7. The method of producing a coolant according to claim 6, further comprising:

adjusting a difference in pressure losses between axially opposite ends of the molded product to be 10 mmH$_2$O or less when it is measured in accordance with the following method:

1) covering an inner peripheral surface of a cylindrically formed coolant from one of its axial end to its one-half the height with an annular covering member;

2) closing one of the first end and the second end of said coolant, in which the covering member is fitted, with a first supporting member having a manometer, closing the other of the first end and the second end of said coolant with a second supporting member having a gas-inflow pipe and a gas-flow meter, and axially fixing said coolant to prevent air from leaking between ends of said coolant and the supporting members;

3) introducing the air at a flow rate of 250 liters/minute from the gas-inflow pipe into an inner space of the covering member under the atmosphere of 20° C., and the pressure loss is measured;

4) turning said coolant the other way round with respect to the axial direction and covering the inner peripheral surface of a cylindrically formed coolant from the other one of its axial end to its one-half the height with the annular covering member;

5) closing the other of the first end and the second end of said coolant, in which the covering member is fitted, with the first supporting member, closing the one of the first end and the second end of said coolant with the second supporting member, and fixing said coolant axially to prevent air from leaking between ends of said coolant and the supporting members;

6) introducing the air at a flow rate of 250 liters/minute from the gas-inflow pipe into an inner space of the covering member under the atmosphere of 20° C., and measuring the pressure loss and 7) obtaining a difference in the pressure-loss values obtained in 3) and 6), and determining its absolute value as a difference in radial pressure losses in the axial ends of said coolant.

8. The method of producing a coolant according to claims 6 or 7, wherein said compressing steps include, the first compression step of compressing a first end of the molded product in its axial direction, and the second compression step of turning the molded product axially upside down and further compressing a second end of the molded product in the axial direction.

9. The method of producing a coolant according claim 8, wherein compressing distances in the first and second compression steps are substantially equal.

10. The method of producing a coolant according to claim 6, further comprising:

compressing the molded product in a the radial direction thereof.

11. A method of producing a coolant according to claim 6, wherein said molded product is an annular laminated body obtained by forming a knitted wire mesh made of stainless-steel wire rods into a cylindrical body, pressing the cylindrical body in the radial direction to form into a plate body, and then rolling said plate body many times cylindrically.

12. An air bag inflator, comprising:

a housing having a gas discharge port;

ignition means adapted to be activated upon an impact;

gas generating means adapted to be ignited and burnt due to activation of the ignition means for generating a combustion gas; and coolant means for one of purifying and cooling said combustion gas, said coolant means being the coolant means according to claim 1.

13. An air bag apparatus, comprising:

an air bad inflator;

an impact sensor for detecting an impact to activate said inflator;

an air bag introducing therein a gas generated by said inflator to inflate; and a module case for accommodating said air bag, wherein said air bag inflator is the inflator according to claim 12.

* * * * *